United States Patent
Singh et al.

(10) Patent No.: US 11,312,892 B2
(45) Date of Patent: Apr. 26, 2022

(54) EMBEDDED TREATMENT FLUID ADDITIVES FOR USE IN SUBTERRANEAN FORMATION OPERATIONS

(71) Applicant: Halliburton Energy Services, Inc., Houston, TX (US)

(72) Inventors: Dipti Singh, Kingwood, TX (US); Aaron Michael Beuterbaugh, Spring, TX (US); Enrique Antonio Reyes, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 139 days.

(21) Appl. No.: 16/330,065

(22) PCT Filed: Dec. 7, 2016

(86) PCT No.: PCT/US2016/065308
§ 371 (c)(1),
(2) Date: Mar. 1, 2019

(87) PCT Pub. No.: WO2018/106224
PCT Pub. Date: Jun. 14, 2018

(65) Prior Publication Data
US 2019/0249065 A1    Aug. 15, 2019

(51) Int. Cl.
| | | |
|---|---|---|
| C09K 8/42 | (2006.01) | |
| C09K 8/04 | (2006.01) | |
| C09K 8/52 | (2006.01) | |
| C09K 8/575 | (2006.01) | |
| C09K 8/68 | (2006.01) | |
| C09K 8/72 | (2006.01) | |
| C09K 8/528 | (2006.01) | |

(52) U.S. Cl.
CPC .................. *C09K 8/04* (2013.01); *C09K 8/42* (2013.01); *C09K 8/52* (2013.01); *C09K 8/528* (2013.01); *C09K 8/5756* (2013.01); *C09K 8/685* (2013.01); *C09K 8/725* (2013.01); *C09K 2208/24* (2013.01); *C09K 2208/26* (2013.01)

(58) Field of Classification Search
CPC . C09K 8/04; C09K 8/42; C09K 8/528; C09K 8/52; C09K 8/5756; C09K 8/685; C09K 8/725; C09K 2208/24; C09K 2208/26
See application file for complete search history.

(56) References Cited

U.S. PATENT DOCUMENTS

| | | | |
|---|---|---|---|
| 4,725,362 A | 2/1988 | Dugat | |
| 5,591,700 A | 1/1997 | Harris et al. | |
| 5,617,920 A * | 4/1997 | Dovan ................. | B01J 13/0065 166/295 |
| 7,992,654 B2 | 8/2011 | deBoer | |
| 8,122,975 B2 | 2/2012 | Belcher et al. | |
| 2006/0018999 A1 | 1/2006 | Risch | |
| 2007/0238622 A1 | 10/2007 | Fu et al. | |
| 2011/0028358 A1* | 2/2011 | Welton ..................... | C09K 8/03 507/219 |
| 2012/0067581 A1* | 3/2012 | Auzerais ............. | C04B 40/0633 166/308.1 |
| 2014/0116704 A1 | 5/2014 | Reddy et al. | |
| 2016/0264852 A1 | 9/2016 | Beuterbaugh et al. | |
| 2018/0258342 A1* | 9/2018 | Nguyen ................... | C09K 8/74 |

FOREIGN PATENT DOCUMENTS

| | | | |
|---|---|---|---|
| WO | 2015017633 A1 | | 2/2015 |
| WO | WO2015/088675 | * | 6/2015 |
| WO | 2016053280 A1 | | 4/2016 |
| WO | 2016053283 A1 | | 4/2016 |
| WO | 2016053288 A1 | | 4/2016 |

OTHER PUBLICATIONS https://en.wikipedia.org/wiki/Acrylate_polymer downloaded on Jan. 13, 2021.*
International Search Report & Written Opinion issued for corresponding International Application No. PCT/US2016/065308, dated Sep. 7, 2017. (12 pages).

* cited by examiner

*Primary Examiner* — Kumar R Bhushan
(74) *Attorney, Agent, or Firm* — McGuireWoods LLP

(57) ABSTRACT

The present disclosure relates to subterranean formation operations and, more particularly, to embedded treatment fluid additives for use in subterranean formation operations. The embedded treatment additives may comprise an aqueous-soluble downhole reactive material embedded in a crosslinked polymeric solution to delay the reactivity of the aqueous-soluble downhole reactive material, thereby forming the embedded treatment additive, wherein the aqueous-soluble downhole reactive material is a solid.

8 Claims, 2 Drawing Sheets

EMBEDDED TREATMENT FLUID ADDITIVES FOR USE IN SUBTERRANEAN FORMATION OPERATIONS

BACKGROUND

The present disclosure relates to subterranean formation operations and, more particularly, to embedded treatment fluid additives for use in subterranean formation operations.

Hydrocarbon producing wells (e.g., oil producing wells, gas producing wells, and the like) are created and stimulated using various treatment fluids introduced into the wells to perform a number of subterranean formation operations. The term "treatment fluid," and grammatical variants thereof, as used herein, refers generally to any fluid that may be used in a subterranean application in conjunction with a desired function and/or for a desired purpose. The term "treatment fluid" does not imply any particular action by the fluid or any component thereof, as various additives may be included in some instances to achieve particular purposes or actions.

Hydrocarbon producing wells are first formed by drilling a wellbore into a subterranean formation, involving circulating a drilling treatment fluid as the wellbore is bored out using a drill bit. Primary cementing may then, although not necessarily, be performed using a cement slurry treatment fluid to enhance the structural integrity of the wellbore. Stimulation of hydrocarbon producing wells involves introducing a fracturing treatment fluid, sometimes called a carrier treatment fluid when particulates entrained therein, into a portion of a subterranean formation (which may also be referred to herein simply as a "formation") above a fracture gradient sufficient to break down the formation and create one or more fractures therein. As used herein, the term "fracture gradient," and grammatical variants thereof, refers to a pressure (e.g., flow rate) necessary to create or enhance at least one fracture in a subterranean formation.

Typically, particulate solids are suspended in a portion of one or more treatment fluids and then deposited into the fractures. The particulate solids, known as "proppant particulates" or simply "proppant," serve to prevent the fractures from fully closing once the hydraulic pressure is removed. By keeping the fractures from fully closing, the proppant particulates form a proppant pack having interstitial spaces that act as conductive paths through which fluids produced from the formation may flow. As used herein, the term "proppant pack," and grammatical variants thereof, refers to a collection of proppant particulates in a fracture, thereby forming a "propped fracture."

During any of the aforementioned subterranean formation operations, or additional subterranean formation operations (e.g., fracturing operations, diversion operations, cementing operations, re-fracturing operations, gravel packing operations, frac-packing operations, acidizing operations, scale dissolution and removal operations, sand control operations, consolidation operations, and the like), one or more additives may be included in the treatment fluid to achieve a particular purpose or action. For example, certain reactive materials may be included in treatment fluids used during one or more subterranean formation operations. In some instances, direct inclusion of such reactive materials may result in their being "spent" or otherwise becoming unreactive before reaching subterranean zones of interest. In other instances, premature reaction of the reactive materials in the treatment fluids may result in formation damage, or corrosion or scale buildup on tubulars or other equipment used to carry out the particular subterranean formation operation.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
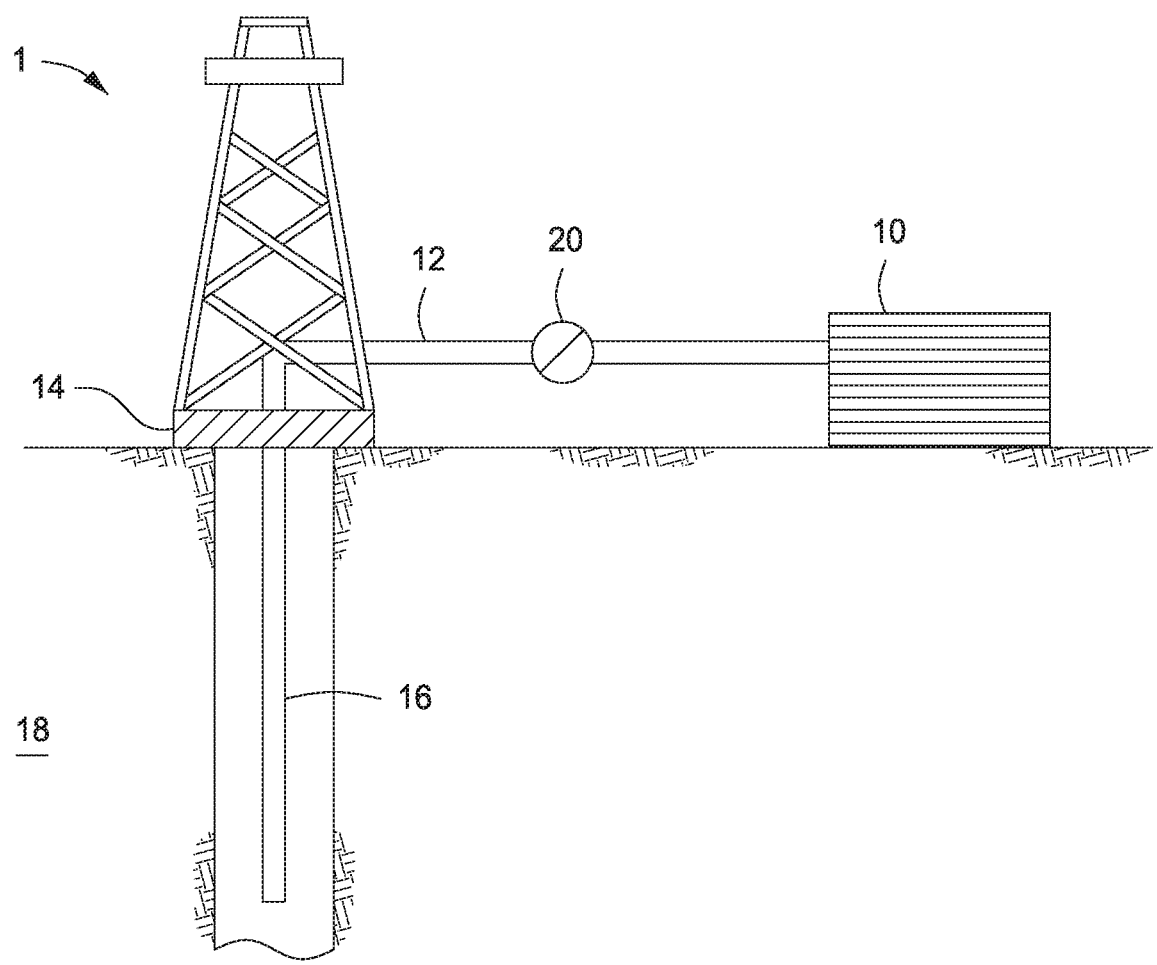
FIG. 1 depicts an illustrative schematic of a drilling assembly in which treatment fluids of the present disclosure may be introduced to a downhole location, according to one or more embodiments of the present disclosure.

The present disclosure relates to subterranean formation operations and, more particularly, to embedded treatment fluid additives for use in subterranean formation operations.

Specifically, the present disclosure relates to embedded treatment fluid additives (also referred to herein simply as "embedded treatment fluid additives" comprising an aqueous-soluble downhole reactive material embedded in a crosslinked polymeric solution to permit controlled delivery of the aqueous-soluble downhole reactive material. That is, the embedded treatment additives described herein are able to delay reaction of the aqueous-soluble downhole reactive material by controlling its release from the crosslinked polymeric solution. As used herein, the term "embedded," and grammatical variants thereof, refers to fixing firmly and deeply in a surrounding mass. As used herein, the term "delay," and grammatical variants thereof, refers to a reduction of about 0.1% to about 99% by weight per weight (w/w) in the activity of an active material compared to the activity of the active material that is not embedded as described herein, encompassing any value and subset therebetween (e.g., about 0.1% to about 80% reduction). In some embodiments, the delay may be about 0.1% to about 75% by w/w in the activity of an active material, or about 0.1% to about 50% by w/w in the activity of an active material, encompassing any value and subset therebetween. In preferred embodiments, the delay may be about 0.1% to about 20% by w/w in the activity of an active material, encompassing any value and subset therebetween, as evidenced by the Example herein. The delay, or release rate of the aqueous-soluble downhole reactive material, depends on a number of factors, such as the thickness of the crosslinked polymeric solution into which the reactive material is embedded, whether the embedded treatment additive is in a fluid (e.g., release rate in a brine fluid would be much slower than release rate in a very dilute aqueous fluid), and the like, and any combination thereof. One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses+/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

As was briefly mentioned above, common acids, such as mineral acids (e.g., hydrochloric acid) and organic acids (e.g., acetic acid), may be hampered during their use in a particular subterranean formation operation (e.g., used in acidizing or fracture acidizing treatments) by reaction kinetic controls due to their high reactivity and aqueous solubility or miscibility. Such uncontrolled reactivity may result in formation damage, which may be exacerbated in the NWB region particularly, depending on the formation's geomechanical properties. As used herein, the term "formation damage," and grammatical variants thereof, refers to an alteration of the formation's integrity related to a reduction in permeability, geomechanical integrity, fines generation, and the like, and any combination thereof. In other instances, common acids may be unable to sufficiently penetrate or stimulate a formation (e.g., previously spent in undesirable locations), cause corrosion of downhole equipment (e.g., casing string, production liners, and the like) or surface equipment (e.g., pumps, valves, and the like). This premature or uncontrolled reactivity may further require increase fluid and/or acid use in the treatment fluid, or additional fluid additives (e.g., to mitigate corrosion, NWB damage, far-field damage, and the like) to effectively stimulate a particular formation, thus exhausting resources and increasing costs.

Accordingly, advantages of the embedded treatment additives described herein include delaying the action or reactivity of a particular embedded aqueous-soluble downhole reactive material. Additional advantages of the methods described herein for forming the embedded treatment additives include, but are not limited to, the ability to embed materials that are traditionally difficult to coat onto substrates, and thus allowing their delayed reaction where such delay could not previously be readily achieved. Further, the methods described herein for forming the embedded treatment additives of the present disclosure avoid incompatibility issues, such as those related to fracturing fluid additives (e.g., gelling agents, crosslinkers, buffers, breakers, clay control additives, gel stabilizers, chelants (e.g., cation control), friction reducers, and the like, and any combination thereof. The embedded treatment additives are solid and thus may be advantageously able to be designed in a variety of sizes and geometries to provide for cost-effective material use in both the near wellbore (NWB) region and the far-field wellbore region. The embedment of the aqueous-soluble downhole reactive material into the crosslinked polymeric solution to form the embedded treatment additives described herein have a symbiotic effect: to reduce, enhance, or to balance the physical characteristics of the aqueous-soluble downhole reactive material to delay its release and thus delay its action or reaction downhole. Moreover, the embedded treatment additives may be useful in any type of subterranean formation, including conventional and unconventional (e.g., low and ultra-low permeability formations, such as shale and tight gas formation). For example, the embedded treatment additive may be particularly beneficial far-field applications (e.g., in unconventional formations) where a controlled, slow release of the aqueous-soluble downhole reactive material may yield sustained or increased production as this material leaches and interacts with the formation (e.g., carbonate laden matrices).

In some embodiments, the present disclosure provides a method comprising introducing a treatment fluid into a subterranean formation. The treatment fluid comprises an aqueous base fluid and an embedded treatment additive. The embedded treatment additive comprises an aqueous-soluble downhole reactive material embedded in a crosslinked polymeric solution, as described below, to delay the reactivity of the aqueous-soluble downhole reactive material. As used herein, the term "aqueous-soluble downhole reactive material," and grammatical variants thereof, refers to aqueous-soluble treatment fluid additives, including those related to fracturing fluid additives (e.g., gelling agents, crosslinkers, buffers, breakers, clay control additives, gel stabilizers, chelants (e.g., cation control), friction reducers, acids, and the like, and any combination thereof. The treatment fluid comprising the embedded treatment additive is introduced into a subterranean formation to perform a particular subterranean formation operation. Any of the aforementioned subterranean formation operations may be performed including, but not limited to, drilling operations, fracturing operations, diversion operations (i.e., NWB and far-field diversion), cementing operations, re-fracturing operations, gravel packing operations, frac-packing operations, acidizing operations (i.e., matrix and fracturing acidizing), scale dissolution and removal operations, formation etching operations, sand control operations, consolidation operations, and the like.

The embedded treatment additive is in solid form. As used herein, the term "solid," and grammatical variants thereof, refers to a phase that is neither liquid nor gas, but does not preclude open spaces at any one or more locations throughout the solid (e.g., pores, channels, and the like). That is, the solid embedded treatment additive is not singly free-flowing and can be of any size beginning at molecular size (e.g., about 0.74 angstroms) and larger. Specifically, the solid embedding treatment additive may be any size that is dispersible. In some embodiments, the solid embedded treatment additive has a unit mesh size of less than about 500 micrometers (µm), but can be larger, without departing from the scope of the present disclosure. As used herein, the term "unit mesh size," and grammatical variants thereof, refers to a size of an object (e.g., the solid embedded treatment additive) that is able to pass through a square area having each side thereof equal to a specified numerical value. In more specific embodiments, the solid embedded treatment additive has a unit mesh size in the range of about 0.5 µm to about 500 µm, encompassing any value and subset therebetween. The unit mesh size of the embedded treatment additive may depend on a number of factors including, but not limited to, the type of subterranean formation operation being performed, the components of the embedded treatment additive, the type of subterranean formation being treated, and the like, and any combination thereof.

The shape of the embedded treatment additives may be any shape suitable for use in the particular subterranean formation and sized according to the unit mesh sizes described herein. Examples of suitable shapes for the embedded treatment additives of the present disclosure include, but are not limited to, spherical-shaped, substantially spherical-shaped, polygonal-shaped, sheet-shaped, rod-shaped, fiber-shaped, and any combination thereof. As used herein, the term "substantially spherical-shaped," and grammatical variants thereof, refers to a material that has a morphology that includes spherical geometry and elliptic geometry, including oblong spheres, ovoids, ellipsoids, capsules, platelets, and the like and may have surface irregularities. The term "polygonal-shaped," and grammatical variants thereof, as used herein, refers to shapes having at least two straight sides and angles. Examples of polygonal proppant may include, but are not limited to, a cube, cone, pyramid, cylinder, rectangular prism, cuboid, triangular prism, icosahedron, dodecahedron, octahedron, pentagonal prism, hexagonal prism, hexagonal pyramid, and the like, and any combination thereof. As used herein, the term "sheet-shaped," and grammatical variants thereof, refers to a shape that has a broad, flat, and continuous surface with substantially no uneven thickness. The term "rod-shaped," and grammatical variants thereof, as used herein, refers to a material having an aspect ratio of greater than about 5 to an unlimited upper limit.

As stated above, the embedded treatment additives comprise at least one aqueous-soluble downhole reactive material embedded in a crosslinked polymer solution to delay the reactivity of the one or more aqueous-soluble downhole reactive material(s), among the other advantages discussed herein. In some embodiments, the aqueous-soluble downhole reactive material is present in the embedded treatment additive in an amount in the range of about 0.1% to about 99% by w/w of the embedded treatment additive, encompassing any value and subset therebetween. Accordingly, in some embodiments, the crosslinked polymer solution is present in the embedded treatment additive in an amount in the range of about 0.1% to about 99% w/w of the embedded treatment additive, encompassing any value and subset therebetween.

The aqueous-soluble downhole reactive material may be, in some embodiments, a chelating agent, a chain transfer agent, a buffer, a crosslinker, a breaker, and any combination thereof, which is embedded in the crosslinked polymer solution, as described below.

Examples of suitable chelating agents may include, but are not limited to, phosphate-based chelating agents; phosphonate-based chelating agents; methylglycine diacetic acid trisodium salt ($Na_3MGDA$), ethylenediaminetetraacetic acid (EDTA); propylenediaminetetraacetic acid (PDTA); nitrilotriacetic acid (NTA); N-(2-Hydroxyethyl)ethylenediamine-N,N',N'-triacetic acid trisodium salt (HEDTA); diethylenetriaminepentaacetic acid (DTPA); hydroxyethyliminodiacetic acid (HEIDA); cyclohexylenediaminetetraacetic acid (CDTA); diphenylaminesulfonic acid (DPAS); ethylenediaminedi(o-hydroxyphenylacetic) acid (EDDHA); glucoheptonic acid; gluconic acid; citric acid; glutamic acid diacetic acid (GLDA); β-alanine diacetic acid (β-ADA); ethylenediaminedisuccinic acid; S,S-ethylenediaminedisuccinic acid (EDDS); iminodisuccinic acid (IDS); hydroxyiminodisuccinic acid (HIDS); polyamino disuccinic acids; N-bis[2-(1,2-dicarboxyethoxy)ethyl]glycine (BCA6); N-bis[2-(1,2-dicarboxyethoxy)ethyl]aspartic acid (BCA5); N-bis[2-(1,2-dicarboxyethoxy)ethyl]methylglycine (MCBA5); N-tris[(1,2-dicarboxyethoxy)ethyl]amine (TCA6); N-methyliminodiacetic acid (MIDA); iminodiacetic acid (IDA); N-(2-acetamido)iminodiacetic acid (ADA); hydroxymethyl-iminodiacetic acid; 2-(2-carboxyethylamino) succinic acid (CEAA); 2-(2-carboxymethylamino) succinic acid (CMAA); diethylenetriamine-N,N"-disuccinic acid; triethylenetetramine-N,N'''-disuccinic acid; 1,6-hexamethylenediamine-N,N'-disuccinic acid; tetraethylenepentamine-N,N''''-disuccinic acid; 2-hydroxypropylene-1,3-diamine-N,N'-disuccinic acid; 1,2-propylenediamine-N,N'-disuccinic acid; 1,3-propylenediamine-N,N'-disuccinic acid; cis-cyclohexanediamine-N,N'-disuccinic acid; trans-cyclohexanediamine-N,N'-disuccinic acid; ethylenebis(oxyethylenenitrilo)-N,N'-disuccinic acid; glucoheptanoic acid; cysteic acid-N,N-diacetic acid; cysteic acid-N-monoacetic acid; alanine-N-monoacetic acid; N-(3-hydroxysuccinyl) aspartic acid; N-[2-(3-hydroxysuccinyl)]-L-serine; aspartic acid-N,N-diacetic acid; aspartic acid-N-monoacetic acid; any salt thereof; any derivative thereof; and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

Examples of suitable phosphate-based and phosphonate-based chelating agents may include, but are not limited to, aminomethylphosphonic acid (AMPA), dimethyl methylphosphonate (DMMP), 1-hydroxyethylidene-1,1-diphosphonic acid (HEDP), aminotris (methylenephosphonic acid) (ATMP), Ethylenediaminetetra (methylenephosphonic acid) (EDTMP), Tetramethylenediaminetetra (methylenephosphonic acid) (TDTMP), Hexamethylenediaminetetra (methylenephosphonic acid) (HDTMP), Diethylenetriaminepenta (methylenephosphonic acid) (DTPMP), Phosphonobutanetricarboxylic acid (PBTC), N-(phosphonomethyl) iminodiacetic acid (PMIDA), 2-carboxyethyl phosphonic acid (CEPA), 2-Hydroxyphosphonocarboxylic acid (HPAA), Aminotris (methylenephosphonic acid) (AMP), N,N-Bis (phosphonomethyl)glycine (BPMG), polymeric phosphonates (e.g., 2-Acrylamido-2-methylpropane sulfonic acid (AMPS), AMPS acrylamide, and the like), any salt thereof, any derivative thereof, and any combination thereof.

As used herein, the term "chain transfer agent," and grammatical variants thereof, refers to a substance able to reach with a chain carrier by a reaction in which the original chain carrier is deactivated and a new chain carrier is generated. The term "chain carrier," and grammatical variants thereof, refers to a species, such as an atom or free radical, which is involved in chain-propagating reactions (e.g., polymerization reactions). Examples of suitable chain transfer agents for use as the aqueous-soluble downhole reactive materials of the present disclosure may include, but are not limited to, a thiol (e.g., dodecyl mercaptan), a halocarbon, (i.e., compounds having one or more carbon atoms linked by covalent bonds with one or more Group 7 halogen atoms), and any combination thereof.

In some embodiments, a buffer may be used as the aqueous-soluble downhole reactive material described herein, such as to provide controlled oversight of the acidity (i.e., pH) of the treatment fluid or a portion of a subterranean formation. Examples of suitable buffers may include, but are not limited to, mixtures of a salt of a weak acid and an organic acid (e.g., mixtures of sodium carbonate and fumaric acid, mixtures of sodium acetate and fumaric acid, mixtures of sodium citrate and citric acid, and the like), sodium acetate, ammonium acetate, sodium carbonate, potassium carbonate, sodium bicarbonate, potassium bicarbonate, sodium or potassium diacetate, sodium hydroxide, potassium hydroxide, lithium hydroxide, and any combination thereof.

The crosslinkers for use as the aqueous-soluble downhole reactive material are solids (i.e., in solid form) and may be used to crosslink polymers or other additives downhole or in a treatment fluid and may be the same or different that the crosslinker used as part of the crosslinked polymeric solution, provided that the selected crosslinker as the aqueous-soluble downhole reactive material does not interfere with the crosslinker in the crosslinked polymeric solution to form the embedded treatment additives described herein. Examples of suitable crosslinkers include, but are not limited to, borate ions, magnesium ions, zirconium IV ions, titanium IV ions, aluminum ions, antimony ions, chromium ions, iron ions, copper ions, magnesium ions, zinc ions, and any combination thereof. These ions may be provided by providing any compound that is capable of producing one or more of these ions. Examples of such compounds may include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, aluminum citrate, antimony compounds, chromium compounds, iron compounds, copper compounds, zinc compounds, and any combinations thereof.

In some embodiments, the aqueous-soluble downhole reactive material is a breaker embedded in the crosslinked polymeric material to allow delayed breaking of the treatment fluid or other introduced treatment fluids in the subterranean formation. Examples of suitable breakers may include, but are not limited to, an acid breaker, a delayed release acid breaker, a temperature activated breaker, a hydrolysable ester breaker, any encapsulated in an encapsulating material, and any combination thereof.

As described above, the selected aqueous-soluble downhole reactive material is a solid and may have a size beginning at molecular size (e.g., about 0.74 angstroms) and larger. Specifically, the solid embedding treatment additive may be any size that is dispersible. In some embodiments, the solid embedded treatment additive has a unit mesh size of less than about 500 micrometers ($\mu$m), but can be larger, without departing from the scope of the present disclosure.

The crosslinked polymer solution comprising a portion of the embedded treatment additive comprises a polymer and a crosslinker. In some embodiments the crosslinked polymer solution is neat (i.e., without further components), non-aqueous, dispersed in an aqueous base fluid, or soluble in an aqueous base fluid, without departing from the scope of the present disclosure. In some embodiments, the polymer is present in the crosslinked polymeric solution in an amount in the range of about 20% to about 80% by w/w of the combined polymer and crosslinker, encompassing any value and subset therebetween. In preferred embodiments, the polymer is present in the crosslinked polymeric solution in the range of about 25% to about 75% by w/w of the combined polymer and crosslinker, or about 50% to about 75% by w/w of the combined polymer and crosslinker, encompassing any value and subset therebetween, as evidenced by the Example herein. In other preferred embodiments, the polymer is present in the crosslinked polymeric solution in about 75% by w/w of the combined polymer and crosslinker, encompassing any value and subset therebetween. The amount of polymer, for example, may depend at least on the desired delay, the particular polymer or polymers selected, and the like, and any combination thereof. For example, a higher concentration of polymer would result comparatively in longer delay than a lesser concentration of polymer.

Examples of suitable polymers for forming the crosslinked polymeric solution may include, but is not limited to, polyvinyl alcohol, gelatin, guar, an acrylate, acrylamide, chitosan, alginate, and any combination thereof. Examples of suitable crosslinkers for forming the crosslinked polymeric solutions may include, but are not limited to, a borate ion; a compound producing a borate ion (e.g., those described above); glutaraldehyde; N,N'-methylenebis(acrylamide); epichlorohydrin; calcium; and any combination thereof.

Examples of pairs of polymers and crosslinkers for use in forming the crosslinked polymeric solution of the present disclosure are shown in Table 1 below.

TABLE 1

| Examples of Polymer and Crosslinker Combinations | |
|---|---|
| Polymer | Crosslinker |
| Gelatin | Glutaraldehyde |
| Guar | Borate ions; Borate ion Compound |
| Acrylates | N,N methylene bisacrylamide |
| Acrylamide | N,N methylene bisacrylamide |
| Chitosan | Glutaraldehyde; epichlorohydrin |
| Alginate | Calcium |

In some embodiments, as described above, the aqueous-soluble downhole reactive material is released downhole during the performance of a subterranean formation operation. The release is delayed, such that over time the release of the aqueous-soluble downhole reactive material occurs during the duration of the operation or at a particular point during the duration of the operation. Mechanisms of release may include, but are not limited to, diffusion of the aqueous-soluble downhole reactive material from the embedded treatment additive, de-crosslinking of the crosslinked polymeric solution, or degradation of the polymer in the crosslinked polymeric solution, and any combination thereof. The mechanism of release of the aqueous-soluble downhole reactive material may depend on a number of factors including, but not limited to, the crosslink density of the crosslinked polymeric solution, exposure temperature, the type of aqueous-soluble downhole reactive material, the presence of other additives in the treatment fluid, and the like, and any combination thereof.

In some preferred embodiments, the aqueous-soluble downhole reactive material is a chelating agent of PMIDA. PMIDA is a solid material, of very low solubility, which can be used in a wide array of subterranean formation operations and application including, for example, diversion (i.e., NWB and far-field diversion), acidizing (i.e., matrix and fracture acidizing), scale control, as a fracturing treatment fluid stabilizer, as a breaker, and as a shale etchant. Many of these applications benefit from delayed release or heightened mechanical integrity, such as in order to minimize attrition or impart ductility, for proper or improved performance, and the like.

As stated above, PMIDA is soluble but displays very low solubility (<0.4% at ambient conditions) in an aqueous medium, unbuffered or without pH adjustment, but does exhibit increased solubility with increasing temperature. Regardless of this low solubility, the resultant pH of the aqueous medium (unbuffered, unadjusted) is about pH 1.6, leading to a highly reactive fluid. By embedding PMIDA into a crosslinked polymeric material, as described herein, the effect of the PMIDA on pH in a treatment fluid can be delayed, such that the treatment fluid may be able to maintain near natural characteristics (i.e., about neutral pH) for an extended period. Overtime, thereafter, based on one of the mechanisms described above, for example, the PMIDA is released and able to perform one or more of the functions described above during a subterranean formation operation (e.g., in a fracturing operation for scale control and/or as a breaker). Accordingly, the release of the PMIDA is controlled and can further be controlled by manipulating the type of polymer in the crosslinked polymeric material, the type of crosslinker in the crosslinked polymeric material, the density of crosslinking of the crosslinked polymeric material, the geometry or size of the embedded treatment additive, and the like, and any combination thereof.

Aqueous base fluids suitable for use in the treatment fluids described herein may include, but are not limited to, fresh water, saltwater (e.g., water containing one or more salts dissolved therein), brine (e.g., saturated salt water), seawater, produced water (e.g., water produced as a byproduct from a subterranean formation during hydrocarbon production), waste water (e.g., water that has been adversely affected in quality by anthropogenic influence) that is untreated or treated, and any combination thereof. Generally, the water may be from any source, provided that it does not contain components that might adversely affect the stability and/or performance of the treatment fluids. Suitable aqueous-miscible fluids may, in some embodiments, include, but not be limited to, an alcohol (e.g., methanol, ethanol, n-propanol, isopropanol, n-butanol, sec-butanol, isobutanol, and t-butanol), a glycerin, a glycol (e.g., polyglycols, propylene glycol, and ethylene glycol), a polyglycol amine, a polyol, any derivative thereof, any in combination with a salt (e.g., sodium chloride, calcium chloride, calcium bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous base fluid described above, and any combination thereof.

The treatment fluids described herein may further include one or more additives, such as, but not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

FIG. 1 shows an illustrative schematic of a system that can deliver the treatment fluids of the present disclosure to a downhole location, according to one or more embodiments.

It should be noted that while FIG. 1 generally depicts a land-based system, it is to be recognized that like systems may be operated in subsea locations as well. As depicted in FIG. 1, system 1 may include mixing tank 10, in which the fluids of the embodiments herein may be formulated. The fluids may be conveyed via line 12 to wellhead 14, where the fluids enter tubular 16, tubular 16 extending from wellhead 14 into subterranean formation 18. Upon being ejected from tubular 16, the fluids may subsequently penetrate into subterranean formation 18. Pump 20 may be configured to raise the pressure of the fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the fluid or a portion thereof (e.g., the broken fluid) may, in some embodiments, flow back to wellhead 14 and exit subterranean formation 18. In some embodiments, the fluid that has flowed back to wellhead 14 may subsequently be recovered and recirculated to subterranean formation 18, or otherwise treated for use in a subsequent subterranean operation or for use in another industry.

It is also to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

While various embodiments have been shown and described herein, modifications may be made by one skilled in the art without departing from the scope of the present disclosure. The embodiments described here are exemplary only and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include:

Embodiment A

A method comprising: introducing a treatment fluid into a subterranean formation, the treatment fluid comprising a first aqueous base fluid and an embedded treatment additive, wherein the embedded treatment additive comprises an aqueous-soluble downhole reactive material embedded in a crosslinked polymeric solution to delay the reactivity of the aqueous-soluble downhole reactive material, and wherein the aqueous-soluble downhole reactive material is a solid; and performing a subterranean formation operation with the treatment fluid Embodiment B An embedded treatment additive comprising: an aqueous-soluble downhole reactive material embedded in a crosslinked polymeric solution to delay the reactivity of the aqueous-soluble downhole reactive material, thereby forming the embedded treatment additive, wherein the aqueous-soluble downhole reactive material is a solid.

Embodiment C

A system comprising: a tubular extending into a subterranean formation; and a pump fluidly coupled to the tubular, the tubular containing a treatment fluid comprising: a first aqueous base fluid and an embedded treatment additive, wherein the embedded treatment additive comprises an aqueous-soluble downhole reactive material embedded in a crosslinked polymeric solution to delay the reactivity of the aqueous-soluble downhole reactive material, and wherein the aqueous-soluble downhole reactive material is a solid.

Each of Embodiments A, B, and C may have one or more of the following additional elements in any combination:

Element 1:
Further comprising releasing the aqueous-soluble downhole reactive material from the crosslinked polymeric solution during performance of a subterranean formation operation.

Element 2:
Wherein the aqueous-soluble downhole reactive material is selected from the group consisting of a chelating agent, a chain transfer agent, a buffer, a crosslinker, a breaker, and any combination thereof.

Element 3:
Wherein the aqueous-soluble downhole reactive material is N-phosphonomethyliminodiacetic acid.

Element 4:
Wherein the crosslinked polymeric solution comprises a polymer and a crosslinker, the polymer selected from the group consisting of polyvinyl alcohol, gelatin, guar, an acrylate, acrylamide, chitosan, alginate, and any combination thereof.

Element 5:
Wherein the crosslinked polymeric solution comprises solution polymer and a crosslinker, the crosslinker selected from the group consisting of a borate ion; a compound producing a borate ion; glutaraldehyde; N,N'-methylenebis (acrylamide); epichlorohydrin; calcium; and any combination thereof.

Element 6:
Wherein the crosslinked polymeric solution comprises a polymer and a crosslinker, and wherein the polymer is present in an amount in the range of from about 20% to about 80% by weight per weight of the combined polymer and crosslinker.

Element 7:
Wherein the embedded treatment additive has a unit mesh size in the range of about 0.5 micrometers to about 500 micrometers.

Element 8:
Wherein the embedded treatment additive has a shape selected from the group consisting of spherical-shaped, substantially spherical-shaped, polygonal-shaped, sheet-shaped, rod-shaped, and any combination thereof.

By way of non-limiting example, exemplary combinations applicable to A, B, and/or C include: 1-8; 2, 4, and 7; 3 and 8; 3, 4, and 6; 5 and 6; 7 and 8; 2, 7, and 8' 4, 5, and 6; 4 and 7; and the like, and any non-limiting combination of any one or all of 1-8.

To facilitate a better understanding of the embodiments of the present disclosure, the following example of preferred or representative embodiments are given. In no way should the following example be read to limit, or to define, the scope of the disclosure.

EXAMPLE

Figure 2:
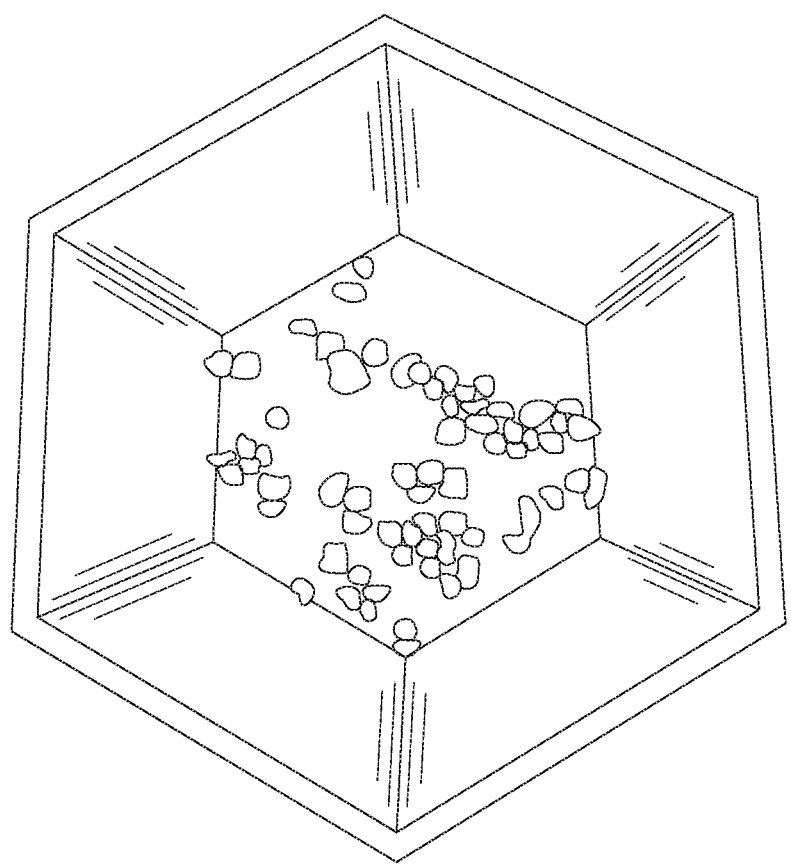
FIG. 2 depicts an image of the embedded treatment additives described herein, according to one or more embodiments of the present disclosure.

In this example, the functionality of the embedded treatment additives of the present disclosure was evaluated. A laboratory experimental setup was used comprising a syringe fluidly connected to a container. Initially, 0.13 grams (g) of PMIDA was dispersed in a solution of in 0.1 g polyvinyl alcohol (PVA) (equivalent 20% weight per volume (w/v)) to yield a viscous solution. This dispersion was placed within the syringe of the experimental setup. The dispersed PMIDA-PVA mixture was injected with the syringe into the bottom of the container, the container containing a borate crosslinker (for crosslinking the PVA). As shown in FIG. 2, the PVA immediately crosslinked to form the solid embedded treatment additive, where the PMIDA was embedded within the crosslinked polymeric solution comprising the PVA and the borate crosslinker, which yielded a pseudo-hardened bead. Accordingly, in this example, the aqueous-soluble downhole reactive material (PMIDA) and the polymer of the crosslinked polymeric solution (PVA) were first dispersed together, and thereafter the dispersion was exposed to the crosslinker (borate) to form the embedded treatment additives described herein. It is to be understood that other sequential additions of the aqueous-soluble downhole reactive material and the components of the crosslinked polymeric solution may be used to form the embedded treatment additives, without departing from the scope of the present disclosure. For example, the crosslinker and the aqueous-soluble downhole reactive material may be first dispersed before exposing the dispersion to the polymer, and the like.

The bead size of the embedded treatment additive was controlled by the injection rate of the syringe in the laboratory experimental setup and physically cut with a spatula, as shown in FIG. 2. Other mechanisms for large scale manufacturing would be employed, such as to achieve the unit mesh sizes and shapes of the embedded treatment additives described above. Further, it was observed that in the absence of cutting the material output from the syringe, a long strand (e.g., rod-shaped or spaghetti-like in the experimental setup) was observed, highlighting the adaptive nature of the embedded treatment additives to achieve any desirable size or shape. It is further contemplated that the embedded treatment additive may be mixed and processed using injection molding process where all of the components (i.e., at least the aqueous-soluble downhole reactive material, the polymer, and the crosslinker) will be batch mixed followed by processing, and where any shape or size may be generated depending on the dye of the injection molding machine.

The embedded treatment additive beads were dried and allowed to further cross-link overnight to enhance structure and produce a physically hardened bead. The embedded treatment additive beads were then measured against a control of PMIDA (0.05 g) alone to determine the pH effect of each sample over time. Each of the control PMIDA and the embedded treatment additive beads produced according to the present example were added to 50 milliliters (mL) of deionized (DI) water (pH~7.0) and the resultant pH change was recorded as a function of time in minutes (min) at room temperature. The results are shown in Table 2 below. Measurements were not taken where "--" is indicated.

TABLE 2

| Control PMIDA | | Embedded Treatment Additive Beads (Ex. 1) | |
| --- | --- | --- | --- |
| Time (min) | pH | Time (min) | pH |
| 10 | 2.8 | 10 | — |
| 30 | — | 30 | 6.5 |
| 60 | — | 60 | 6.0 |
| 1440 (24 hours) | — | 1440 (24 hours) | 2.5 |

As shown in Table 2, the embedded treatment additive beads delayed imparting acidity to the DI water for almost 24 hours, reaching approximately the same pH as the PMIDA alone after only 10 minutes. This was true even though the embedded treatment fluid comprised more than double the amount of PMIDA compared to the control PMIDA.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. No limitations are intended to the details of construction or design herein shown, other than as described in the claims below. The particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of or" consist of the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method of performing a subterranean formation operation with a treatment fluid comprising:
   introducing the treatment fluid into a subterranean formation, the treatment fluid comprising a first aqueous base fluid and an embedded treatment additive,
   wherein the embedded treatment additive is a solid particulate comprising an aqueous-soluble downhole reactive material comprising N-phosphonomethyliminodiacetic acid embedded in a crosslinked polymeric solution comprising polyvinyl alcohol to delay the reactivity of the aqueous-soluble downhole reactive material; and
   performing the subterranean formation operation with the treatment fluid.

2. The method of claim 1, wherein the embedded treatment additive further comprises an additional aqueous-soluble downhole reactive material selected from the group consisting of a chelating agent, a chain transfer agent, a buffer, a crosslinker, a breaker, and any combination thereof.

3. The method of claim 1, comprising an additional crosslinked polymeric solution comprising a polymer and a crosslinker, the polymer selected from the group consisting of gelatin, guar, an acrylate, acrylamide, chitosan, alginate, and any combination thereof.

4. The method of claim 1, wherein the crosslinked polyvinyl alcohol comprises a crosslinker selected from the group consisting of a borate ion; a compound producing a borate ion; glutaraldehyde; N,N'-methylenebis(acrylamide); epichlorohydrin; calcium; and any combination thereof.

5. The method of claim 1, wherein the crosslinked polyvinyl alcohol comprises polyvinyl alcohol and a crosslinker, and
   wherein the polyvinyl alcohol is present in an amount in the range of from about 20% to about 80% by weight per weight of the combined polyvinyl alcohol and crosslinker.

6. The method of claim 1, wherein the N-phosphonomethyliminodiacetic acid has a unit mesh size in the range of about 0.5 micrometers to about 500 micrometers.

7. The method of claim 1, wherein the N-phosphonomethyliminodiacetic acid has a shape selected from the group consisting of spherical-shaped, substantially spherical-shaped, polygonal-shaped, sheet-shaped, rod-shaped, and any combination thereof.

8. The method of claim 1, further comprising releasing the aqueous-soluble N-phosphonomethyliminodiacetic acid from the crosslinked polyvinyl alcohol during performance of the subterranean formation operation.

* * * * *